(12) United States Patent
Bentz et al.

(10) Patent No.: US 7,980,202 B2
(45) Date of Patent: Jul. 19, 2011

(54) APPARATUS FOR PREVENTING ENTANGLEMENT OF MULTIPLE LINES FED FROM SEPARATE REELS

(75) Inventors: Christopher Kent Bentz, Wilmington, NC (US); Garet Itz, Austin, TX (US)

(73) Assignee: Christopher Kent Bentz, Wilmington, NC (US)

( * ) Notice: Subject to any disclaimer, the term of this patent is extended or adjusted under 35 U.S.C. 154(b) by 610 days.

(21) Appl. No.: 12/008,701

(22) Filed: Jan. 11, 2008

(65) Prior Publication Data

US 2009/0178627 A1    Jul. 16, 2009

(51) Int. Cl.
*A01K 27/00*    (2006.01)
*B65H 75/34*    (2006.01)
(52) U.S. Cl. ........................................ 119/796
(58) Field of Classification Search .......... 119/794–796; 242/388, 388.6, 388.3, 388.7, 384.3; 188/82.34
See application file for complete search history.

(56) References Cited

U.S. PATENT DOCUMENTS

| | | |
|---|---|---|
| 2,314,504 A | 3/1943 | Lifchultz |
| 3,198,175 A | 8/1965 | Dean |
| 3,250,253 A | 5/1966 | Galin |
| 3,477,410 A | 11/1969 | Lettieri |
| 3,693,596 A | 9/1972 | Croce et al. |
| 3,776,198 A | 12/1973 | Gehrke |
| 3,853,283 A | 12/1974 | Croce et al. |
| 4,018,189 A | 4/1977 | Umphries et al. |
| 4,165,713 A | 8/1979 | Brawner et al. |
| 4,328,766 A | 5/1982 | Deibert |
| 4,328,767 A | 5/1982 | Peterson |

(Continued)

FOREIGN PATENT DOCUMENTS

WO    WO2006/099431 A1    9/2006

OTHER PUBLICATIONS

Product Catalog: "Water-fun products and accessories for you and your pet," 2010, 7 pages, Paws Aboard, LLC, Tampa, Florida, www.pawsaboard.com.

(Continued)

*Primary Examiner* — Joshua J Michener
*Assistant Examiner* — Brian M. O'Hara
(74) *Attorney, Agent, or Firm* — Venable LLP; Michael A. Satori; Steven J. Schwarz (57) ABSTRACT

An apparatus for preventing entanglement of lines fed from separate reels has at least two reels mounted on separate axles. A separate line is wound around each reel. Each axle is mounted on one of at least two rotatable split shaft members. Each split shaft member is connected to one of at least two non-rotating controls by means of one of at least two non-rotating brake rods, arranged such that operating one or another of said controls results in one or another of said reels being made to contact a fixed portion of the apparatus and brought to a halt or, if already halted, released and positioned so as to permit the line wound thereon to resume being fed out. The lines, each of which is separately fed out and retracted onto a respective one of the reels, are fed through holes formed in a faceplate mounted on one end of the assembled said split shaft members such that crossing of the lines tends to cause said faceplate, along with the split shaft members and the two reels, to rotate and disentangle said lines. One embodiment is a pet leash apparatus for exercising two or more pets.

10 Claims, 4 Drawing Sheets

U.S. PATENT DOCUMENTS

| | | |
|---|---|---|
| 4,501,230 A | 2/1985 | Talo |
| 4,887,551 A | 12/1989 | Musetti |
| 4,964,370 A | 10/1990 | Peterson |
| 5,377,626 A | 1/1995 | Kilsby et al. |
| 5,483,926 A | 1/1996 | Bogdahn |
| 5,489,010 A | 2/1996 | Rogers |
| 5,595,143 A | 1/1997 | Alberti |
| 5,890,456 A | 4/1999 | Tancrede |
| 6,003,472 A | 12/1999 | Matt et al. |
| 6,024,054 A | 2/2000 | Matt et al. |
| 6,148,773 A | 11/2000 | Bogdahn |
| 6,474,270 B1 | 11/2002 | Imes |
| 6,526,918 B1 | 3/2003 | Arnold |
| 6,648,261 B2 | 11/2003 | Irving |
| 6,712,026 B1 | 3/2004 | Carville, Jr. |
| 6,792,893 B1 * | 9/2004 | Quintero et al. .............. 119/796 |
| 6,845,736 B1 | 1/2005 | Anderson |
| 6,886,499 B2 | 5/2005 | Meissner |
| 6,904,872 B2 | 6/2005 | Muller |
| 6,912,975 B1 | 7/2005 | Balan |
| 7,017,527 B2 | 3/2006 | Price |
| 7,036,459 B1 | 5/2006 | Mugford et al. |
| 7,040,257 B2 | 5/2006 | Waxman et al. |
| 7,131,401 B2 | 11/2006 | Huff et al. |
| 7,168,393 B2 | 1/2007 | Bogdahn et al. |
| 7,207,296 B2 | 4/2007 | DiDonato |
| 2003/0042350 A1 | 3/2003 | Irving |
| 2003/0145803 A1 | 8/2003 | Muller |
| 2004/0154556 A1 | 8/2004 | Masterson et al. |
| 2004/0237906 A1 | 12/2004 | Waxman et al. |
| 2004/0237907 A1 | 12/2004 | Muller |
| 2005/0011472 A1 | 1/2005 | Wuensche |
| 2005/0103282 A1 | 5/2005 | Huff et al. |
| 2005/0211189 A1 | 9/2005 | Price |
| 2005/0263103 A1 | 12/2005 | Updyke et al. |
| 2006/0144343 A1 | 7/2006 | Price |
| 2006/0185618 A1 | 8/2006 | Hetland |
| 2006/0201449 A1 * | 9/2006 | DiDonato ..................... 119/795 |
| 2006/0236956 A1 | 10/2006 | Lord |
| 2007/0022975 A1 | 2/2007 | Arnold |
| 2007/0039560 A1 | 2/2007 | Smith |
| 2007/0131177 A1 | 6/2007 | Perkitny |
| 2007/0204806 A1 | 9/2007 | Hurwitz |
| 2008/0000433 A1 | 1/2008 | DiDonato |
| 2008/0017134 A1 | 1/2008 | Robley et al. |
| 2009/0120376 A1 | 5/2009 | Foster |

OTHER PUBLICATIONS

International Search Report dated Mar. 9, 2009 from PCT/US2009/000186.

* cited by examiner

APPARATUS FOR PREVENTING ENTANGLEMENT OF MULTIPLE LINES FED FROM SEPARATE REELS

FIELD OF THE INVENTION

The present invention relates to apparatus for preventing entanglement of lines fed from reels.

SUMMARY OF THE INVENTION

The present invention is a multi-reel, line handling apparatus with at least two reels and operable with at least two lines. The reels are mounted on a rotatable assembly. The entire assembly, with at least some of its reels attached, rotates as needed about a central axis to compensate for any twisting of the deployed lines, thereby preventing tangling. Each reel has its own independent reel braking capability. In use, the device permits line to be payed out from the reels and used relatively independently and without tangling. For example, one embodiment of the apparatus of the invention is suitable for use with two or more mobile pets on two separate leashes and with the apparatus of the invention serving to minimize tangling of the two leashes.

DETAILED DESCRIPTION OF AN EMBODIMENT OF THE INVENTION

According to an aspect of the invention, a multi-reel, line-handling apparatus comprises at least two reels mounted on a straight rotatable shaft. The reels and the shaft comprise a rotatable assembly. The axis of the shaft lies along a central axis of the apparatus. When the shaft rotates about that central axis, it carries with it the assembly and the reels mounted thereon. If the lines payed out from the reels tend to become twisted, rotation of the assembly in the same direction as the twisting causes the lines to untwist. Each reel has a reel brake. Each reel brake tends to restrict rotation of its reel about the reel's own axis, thereby controlling the paying out of the line wound on the reel. But applying the reel brake does not restrict the rotation of the assembly about the central axis. This lack of restriction permits the assembly to rotate freely and continue untwisting the lines essentially independently of the degree of reel brake application.

According to an aspect of the invention, a multi-reel, line-handling apparatus comprises at least two reels, each reel being individually positionable and rotatable about its own axis of rotation. On each reel is wound a line having one end anchored to the reel on which it is wound and an opposite end adapted for fastening to an object. The apparatus has a rotatable assembly that rotates about a central axis, wherein the rotating assembly comprises at least two reels. The axes of the reels have a fixed angular relation to the central axis. That angular relation is preselected to facilitate rotation of the assembly about the central axis. In one embodiment the preselected angular relation of the reel axes to the central axis is substantially 90 degrees. The apparatus also has at least one brake engageable with a reel to restrict unwinding of the line wound thereon. When a brake is engaged with a reel, the rotatable assembly can continue to rotate freely about the central axis. This permits continuous rotation of the rotatable assembly in response to tension on the lines regardless of whether a brake is applied.

In accordance with another aspect of the invention there is a second brake engageable with a second reel to restrict unwinding of the line wound thereon.

In accordance with another aspect of the invention the brake is part of the rotatable assembly that rotates about the central axis.

In accordance with another aspect of the invention, there is a rotatable shaft on which the reels are mounted and a first brake rod mounted such that when the brake rod is actuated, exactly one reel moves in a direction parallel to the shaft so as to engage a brake that restricts rotation of the reel. There is also a second brake rod mounted such that when that second brake rod is actuated, another reel moves in a direction parallel to the shaft so as to engage a brake that restricts rotation of that reel.

In accordance with still another aspect of the invention, the multi-reel, line-handling apparatus further includes a faceplate located proximate to the reels. The faceplate has two or more oppositely positioned holes through which the lines are passed. The faceplate responds to pull by an object fastened to one of two lines being used by rotating in a direction that tends to prevent crossing of the lines.

In accordance with yet another aspect of the invention the rotatable shaft on which the reels are mounted has at least two elongated members located between the reels, each one of the members providing support for at least one of the reels. Each brake rod engages one of the elongated members so as to move the member, thereby causing engagement of the corresponding reel mounted on it with a brake so as to restrict rotation of that reel. The elongated members can be spring-loaded, with each spring urging each reel away from a brake. Each brake rod can overcome the spring loading for its reel.

In accordance with another aspect of the invention, the elongated members contain a plurality of cavities capable of partially containing the brake rods; the brake rods have enlarged portions, which engage some of the cavities and not other of the cavities, so as to transfer brake rod motion to those of the elongated members having cavities engaged with the brake rods but not to the elongated members lacking cavities with which the brake rods are engaged.

In accordance with another aspect of the invention, a multi-pet retractable leash apparatus comprises at least two reels on each of which is wound a leash having one end anchored to the reel on which it is wound and an opposite end adapted for being fastened to one or more pets. This aspect further contains at least two axles each of which rotatably mounts one of the reels, and means mounting the axles, the means being adapted for shifting the position of the axles, and brakes responsive to the shifting for braking a selected one of the reels.

In accordance with yet another aspect of the invention, the means adapted for shifting contains at least two spring-loaded elongated members located between the reels. Each of these elongated members provides support for an outwardly extending one of the axles. The spring loading of the members tends to maintain the axles in a position such that the means for braking is disengaged. This aspect further contains means for manually pulling on selected of the members causes engagement of the corresponding reel(s) mounted thereon with other structure(s) operative to brake the reel(s).

In accordance with another aspect of the invention, there is a faceplate located proximate to the reels and having at least two oppositely positioned holes through which the leashes are passed. The faceplate responds to tension on at least one of the leashes by rotating in a direction that tends to prevent crossing of the leashes. The faceplate can be a round disc. The faceplate can rotate in correspondence with the elongated members about the longitudinal axis thereof.

In accordance with still another aspect of the invention, the apparatus includes a housing inside which the reels, axles, means for shifting and the means responsive to shifting are mounted as a rotatable assembly that rotates about a central axis.

In accordance with another aspect of the invention, a multi-pet retractable leash apparatus has a faceplate located proximate to the reels and has at least two oppositely positioned holes through which each leash is passed. The faceplate is responsive to tension on the leashes by rotating in a direction that tends to prevent crossing of the leashes.

In accordance with another embodiment of the invention, a multi-pet retractable leash apparatus having means adapted for shifting the position of the axles comprising at least two spring-loaded elongated members located between the reels, wherein each of the elongated members provides support for an outwardly-extending one of the axles, and wherein the spring loading of the members tends to maintain the axles in position when the means for braking is disengaged. The apparatus also has means for manually pulling on selected members thereby causing engagement of the corresponding reel(s) mounted thereon with other structure(s) operative to brake the reel(s). Also the faceplate is a round disk mounted at one end of the elongated members and adapted to rotate in correspondence with the elongated members about their longitudinal axis.

In accordance with another embodiment of the invention, the multi-pet retractable leash apparatus includes a housing in which the reels, shafts means mounting the axles, and means responsive to the shifting for braking are mounted as a rotatable assembly which rotates about a central axis, wherein the rotatable assembly comprises at least two reels.

In accordance with another aspect of the invention, the means for mounting the axles and adapted for shifting the position of either of the axles comprises a main shaft split longitudinally into two split shaft members, each split shaft member having one of the axles mounted on it, and the main shaft having at least one brake rod with an enlarged end, the enlarged end located in cavities inside both split shaft members, the brake rod engaging the split shaft members differently depending on cavity differences between the split shaft members, and the brake rod having radial symmetry such that brake rod engagement of the split shaft members is independent of the angular position of the brake rod relative to the angular position of the split shaft members.

In accordance with another aspect of the invention, a multi-pet retractable leash apparatus comprises at least two reels on each of which is wound a leash having one end anchored to the reel on which it is wound and an opposite end adapted for being fastened to one or more pets. It also contains at least two axles, each of which rotatably mounts one of the reels, as well as means mounting the axles, the mounting means comprising elongated members located between the reels, each one of the elongated members providing support for an outwardly extending one of the axles, and adapted for shifting the position of either of the axles. The axles and the elongated members are mounted as an assembly, the assembly being capable of rotating around a central axis. The apparatus also includes means for pulling on selected of the members causing engagement of the corresponding reel mounted thereon with another structure operative to brake the reel. The means for pulling comprises at least one brake rod with an enlarged end, the enlarged end located in cavities inside the elongated members, the brake rod engaging the elongated members differently depending on cavity differences between the elongated members. Brake rod engagement of the split shaft members is independent of the angular position of the brake rod relative to the angular position of the split shaft members.

In accordance with another aspect of the invention, spring loading of the elongate members urges each the reel away from the brake. The spring loading can be overcome by one of the at least one brake rods.

In accordance with another aspect of the invention the axles are perpendicular to the central axis.

Figure 1:
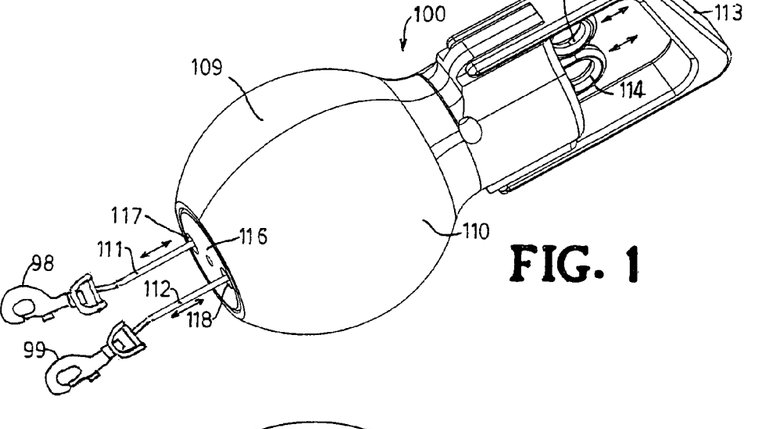
FIG. 1 is a perspective view of a hand-held pet leash embodiment of the non-tangling apparatus of the invention, illustrated as being enclosed in a housing.

FIG. 1 is a perspective view of an illustrative pet leash embodiment of the invention. Exterior parts of leash apparatus 100 include a molded housing having a first housing half section 109, a second housing half section 110 and a handle 113, illustrated by way of example as being attached to the proximal end of the housing, i.e., the end of the housing that in use is closest to the leash user who is walking his or her pets. The apparatus further includes an inner brake rod trigger 114 and an outer brake rod trigger 115, each of which protrudes from the proximal end of the housing into the area encompassed by handle 113. These triggers operate the leash reel brakes, as described below. A faceplate 116 is at the distal end of the housing, i.e., the end of the housing that in use is closest to the pets that are being walked by the leash user. Faceplate 116 contains a first leash passage 117 and a second leash passage 118, through which pass first leash 111 and second leash 112. These leashes can be made of any material useful for leashing pets and that can be wound around leash reels; they are preferably, but need not be, string-like in configuration. At the distal end of first leash 111 is schematically illustrated first fastener 98 for attaching one or more pets to the end of first leash 111. At the distal end of second leash 112 is schematically illustrated second fastener 99 for attaching one or more pets to the end of second leash 112.

Figure 2:
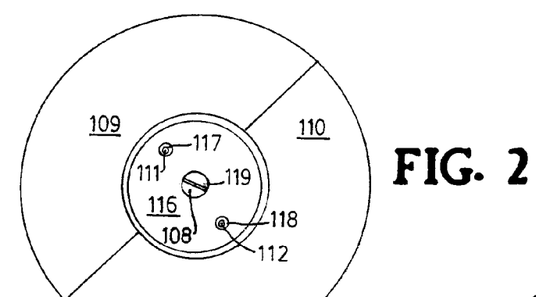
FIG. 2 is a front view of the faceplate through which the leashes pass.
Figure 4:
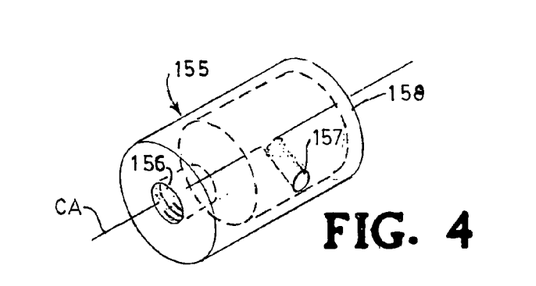
FIG. 4 is an enlarged perspective view of the mounting tube to which the faceplate is secured.
Figure 6:
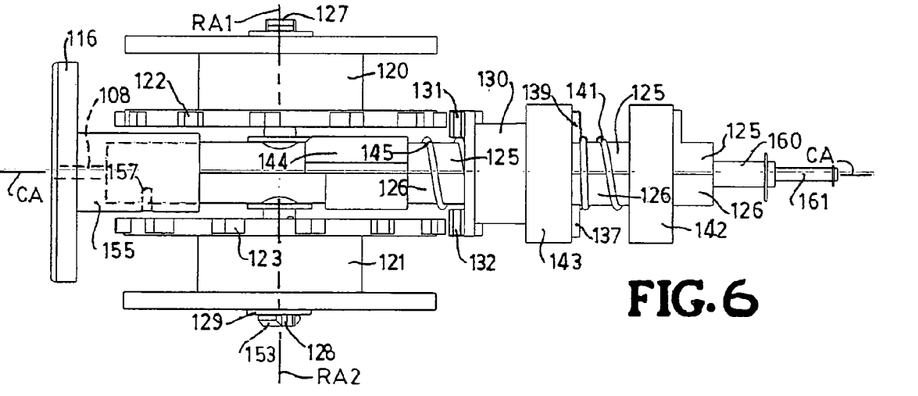
FIG. 6 is a plan view taken without the housing, without the manually actuated pull mechanism for operating the leash braking devices and with the reel axles shown in an aligned position.

FIG. 2 shows the distal end of the apparatus, with faceplate 116 surrounded by first housing half section 109 and second housing half section 110. First leash passage 117 and second leash passage 118 are also shown. First leash 111 and second leash 112 are shown passing through first leash passage 117 and second leash passage 118, respectively. The leash passages are laterally separated and located opposite each other on the face of faceplate 116. A fastener such as machine screw 108 passes through fastener opening 119 in the center of faceplate 116 to fasten the faceplate 116 to a threaded opening 156 formed in mounting tube 155 as shown in FIG. 4. A hollow end of tube 155 snugly and slidably receives the distal ends of first and second split shaft members 125, 126 as illustrated in FIG. 6. A pin 157 passes through an outer wall of tube 155 and into second split shaft member 126.

Figure 3:
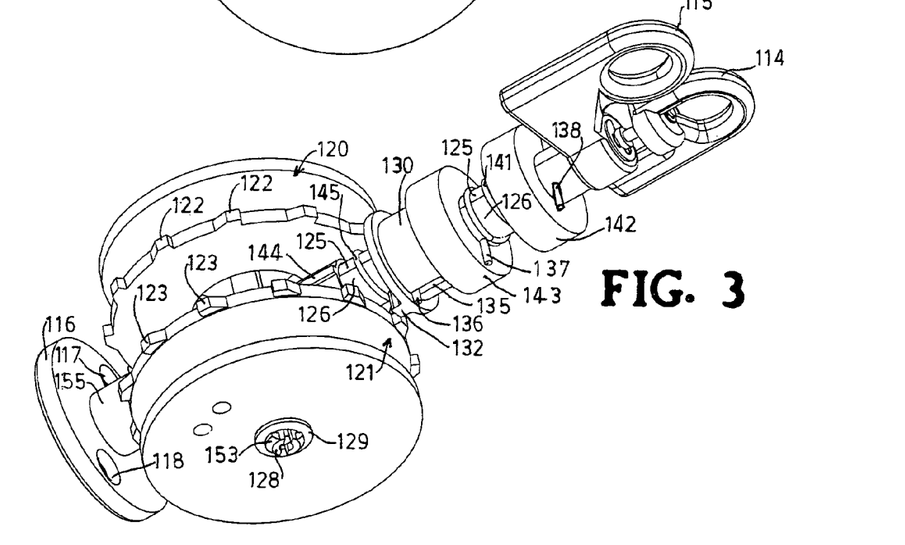
FIG. 3 is a perspective view taken without the housing and leashes and showing the major components that reside within the housing as well as some components that reside outside the housing.

FIG. 3 shows the interior of the apparatus with the housing and leashes removed. The interior parts can be grouped into non-rotating parts and parts that constitute the rotatable sub-assembly. The non-rotating parts include inner brake rod trigger 114 and outer brake rod trigger 115, inner brake rod 161 and outer brake rod 160 (FIGS. 6 and 8), along with the outer races of proximal bearing ring 142 and distal bearing ring 143.

The rotatable sub-assembly rotates about an axis referred to for convenience as a "central" axis CA (FIG. 6) that runs the length of the device. The rotatable sub-assembly unit comprises a shaft configuration made up of a shaft split longitudinally into a first split shaft member 125 and a second split shaft member 126, both split shaft members being slidably mounted on each other and in the inner races of proximal bearing ring 142 and distal bearing ring 143. Mounted on first split shaft member 125 is first reel axle 127 (FIG. 6), on which is rotatably mounted first reel assembly 120. Mounted on second split shaft member 126 is second reel axle 128 (FIG. 6) on which is rotatably mounted second reel assembly 121. FIG. 3 shows second reel assembly 121 mounting rotatably on second reel axle 128 using ring bearing 129. Ring bearing retaining lip 153 (FIG. 5) holds the ring bearing on the axle. First reel assembly 120 mounts rotatably on first reel axle 127 (FIG. 6) using a ring bearing in the same manner. The reel assemblies are preferably mounted side-by-side. The rotatable sub-assembly further includes round faceplate 116 affixed to mounting tube 155 (FIG. 6), which in turn is pinned to second split shaft member 126 as previously described. Thus, when second split shaft member 126 moves axially along the central axis CA (FIG. 6), mounting tube 155 and faceplate 116 move axially with it.

The entire rotatable sub-assembly rotates as a unit about the central axis CA inside a stationary housing made up of two housing half sections 109 and 110 (FIG. 1). As will be appreciated, first leash 111 and second leash 112 extend through first leash passage 117 and second leash passage 118, respectively, and are wound on respective reel assemblies 120 and 121. Each reel assembly has an independent rewind spring (not shown) that serves to rewind its respective leash when the leash is sufficiently slack.

The face of first reel assembly 120 closest to first split shaft member 125 has a set of first brake teeth 122 around its circumference. The face of second reel assembly 121 closest to second split shaft member 126 has a similar set of second brake teeth 123 around its circumference. When braking of the second reel assembly 121 is called for, second reel assembly 121 moves in an proximal direction so as to bring second brake teeth 123 closer to second brake catch 132 mounted on brake collar 130. When second brake teeth 123 actually contact second brake catch 132, the brake teeth engage the brake catch, thus causing the reel to stop turning. First reel assembly 120, first brake teeth 122, and first brake catch 131 (FIG. 6) operate in a similar manner.

Two brake collar slots (one slot, 135, is shown in FIG. 3) are located on opposing sides of brake collar 130. First split shaft member 125 and second split shaft member 126 have pins (one of which, first pin 136, is shown in FIG. 3 on split shaft member 126) each of which protrudes through one of the brake collar slots (one of the two slots, brake collar slot 135, is shown). The distal end of distal shaft return spring 145 presses against the spring extender 144, which in turn presses against the inner portion of a reel axle. The proximal end of distal shaft return spring 145 presses against brake collar 130, thereby urging brake collar 130 against the inner race of distal bearing ring 143. Since the housing holds distal bearing ring 143 stationary, distal shaft return spring 145 can keep brake collar 130 stationary by urging it against the inner race of the bearing, while at the same time allowing the split shaft members which pass through brake collar 130 to slide freely along the central axis within the collar. Each split shaft member mounts a pin against which proximal shaft return spring 141 presses. First shaft member 125 mounts third pin 139 (FIG. 6); second split shaft member 126 mounts second pin 137. In use, proximal shaft return spring 141 presses against these two pins, thereby urging the pins and the shafts to which they are attached distally along central axis CA so as to urge the brake teeth away from the brake catches. The inner race of distal bearing ring 143 stops proximal shaft return spring 141 from pushing the split shaft members too far distally. A fourth pin 138 (FIG. 3) affixed to second split shaft member 126 serves to help maintain the position of proximal bearing ring 142. Split shaft members 125 and 126 slide freely along the central axis CA within the inner race of proximal bearing ring 142 and the inner race of distal bearing ring 143. The outer race of each bearing ring mounts within the housing as shown. This arrangement permits the rotatable sub-assembly to rotate while also allowing the split shaft members to slide independently within a limited range of axial travel.

Referring to FIG. 4, mounting tube 155 as previously mentioned is shown with threaded mounting tube opening 156. First split shaft member 125 and second split shaft member 126 are inserted (FIGS. 4 and 6) into an opening in the hollow end of mounting tube 155 opposite the threaded mounting tube opening 156. The mounting tube thus captures the distal ends of split shaft members 125 and 126 and keeps the members from separating. Mounting tube 155, into which members 125 and 126 are received, fastens to second split shaft member 126 using a mounting tube pin 157 (FIG. 6) inserted through a mating mounting tube shaft pin opening and into second split shaft member 126. Mounting tube 155 is not fastened to first split shaft member 125.

Figure 5:
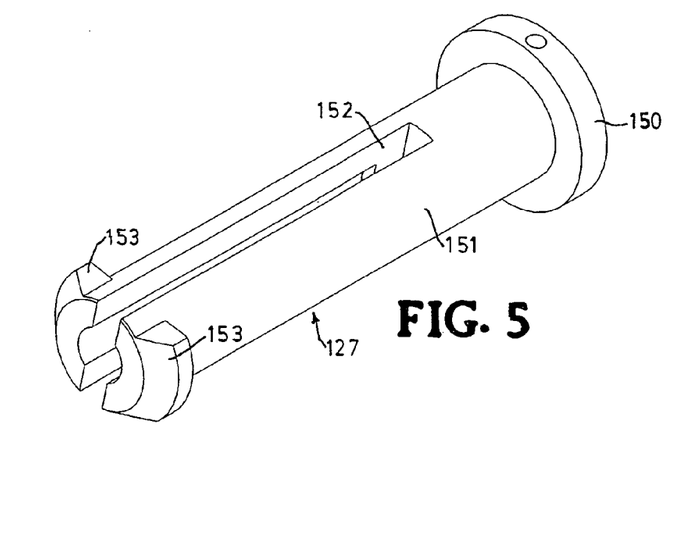
FIG. 5 is an enlarged perspective view of the reel axle for the first reel, the reel axle for the second reel being of duplicate construction.

FIG. 5 is a single drawing representing the construction used in both first reel axle 127 and identical second reel axle 128. Each reel axle has a reel axle head 150. The head of first reel axle 127 engages first hole lip 163 in first hole 162 shown somewhat schematically in FIG. 7. The head of second reel axle 128 engages second hole lip 183 in second hole 180 shown somewhat schematically in FIG. 9, described below. Reel axle shaft 151 extends the width of its reel apparatus. Reel axle split 152 enables the axle to be compressed at its outside end, the end opposite reel axle head 150, so that ring bearing 129 can be slipped over ring bearing retaining lip 153. After assembly, a wedge (not shown), keeps reel axle split 152 open at its outside end near the bearing ring. The wedge is inserted into reel axle split 152 from the outside end to prevent the split from collapsing and releasing the bearing ring.

Figure 8:
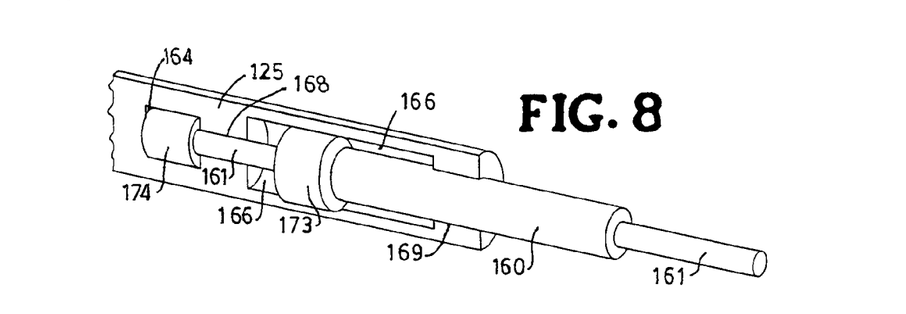
FIG. 8 is a perspective partial view of the first split shaft member with the inner and outer brake rods installed.
Figure 10:
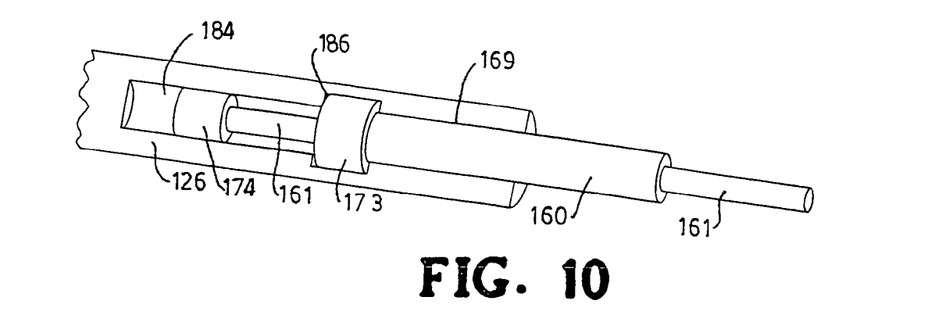
FIG. 10 is a perspective partial view of the second split shaft member with the inner and outer brake rods installed.
Figure 11:
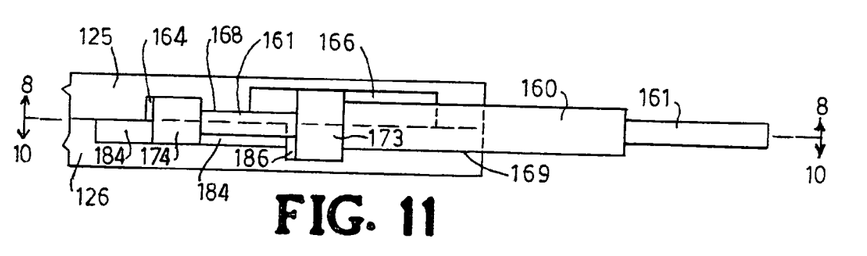
FIG. 11 is a sectional view of assembled parts of both split shaft members showing the brake rods installed.

FIG. 6 is a plan view of apparatus normally enclosed but shown without its housing. The view shows faceplate 116, first split shaft member 125 and second split shaft member 126, first reel assembly 120 and second reel assembly 121, first reel axle 127 and second reel axle 128. The split shaft members are spring-loaded elongated members that constitute a rotatable shaft on which the reels are mounted using axles. In FIG. 6 the reel axles are shown aligned. FIG. 6 also shows proximal bearing ring 142 and distal bearing ring 143, distal shaft return spring 145 and proximal shaft return spring 141. FIG. 6 also provides a view of distal shaft return spring 145 pressing spring extender 144 distally against part of first reel axle 127, thereby forcing first brake teeth 122 distally away from first brake catch 131. Proximal shaft return spring 141 is shown pressing against proximal bearing ring 142 as well as second pin 137 and third pin 139, thereby urging the pins and the split shaft members on which they are mounted (and consequently their reel assemblies with their brake teeth) distally away from the brake catches. Outer brake rod 160 and inner brake rod 161 are also shown. The proximal portion of inner brake rod 161 is shown entering an opening in the proximal end of outer brake rod 160. FIGS. 8, 10 and 11 show the distal end of inner brake rod 161 emerging from the distal end of outer brake rod 160 in order to engage first split shaft member 125. The proximal portion of outer brake rod 160 is shown entering an opening in the proximal end of the pair of split shaft members 125 and 126. Once inside the split shaft members, the distal end of outer brake rod 160 engages second split shaft 126 (FIGS. 8, 10 and 11). FIG. 6 also shows faceplate 116, mounting tube 155, mounting tube shaft pin opening 157, first and second brake teeth 122 and 123, ring bearing 129, ring bearing retaining lip 153, brake collar 130 and second brake catch 132. FIG. 6 also shows the rotatable sub-assembly, whose main components include split shaft members 125 and 126 extending along the central axis CA, faceplate 116 and reel assemblies 120 and 121.

Figure 7:
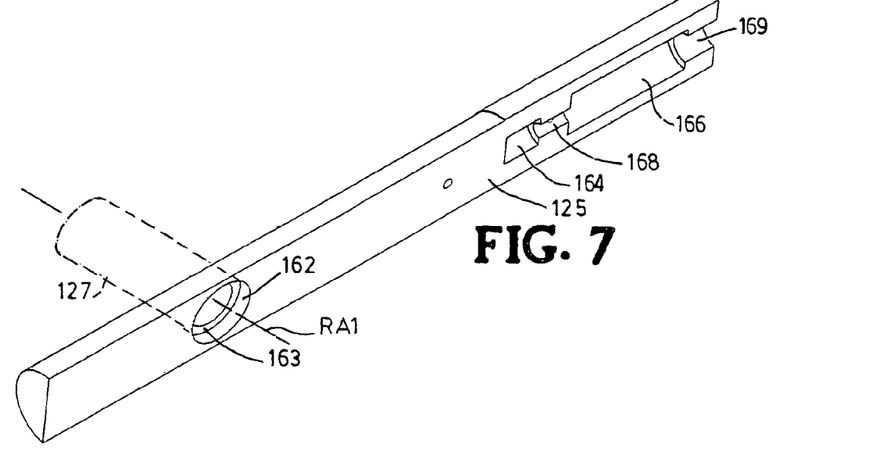
FIG. 7 is an enlarged perspective view of the first split shaft member used for supporting the schematically illustrated axle of the first reel and for braking that reel.

FIG. 7 is a perspective view of first split shaft member 125. First split shaft member 125 supports first reel assembly 120 by receiving and mounting the inner end of first reel axle 127 in first hole 162. Surrounding the outer edge of first hole 162 is first hole lip 163. The first hole lip has an inside diameter that is larger than the diameter of reel axle shaft 151, thereby permitting the shaft to pass through the opening formed by the lip, but smaller than the outside diameter of reel axle head 150. Thus, when reel axle shaft 151 of first reel axle 127 is inserted into first hole 162, reel axle shaft 151 passes through the hole, but the head is caught and held in place by the lip. The figure shows outer brake rod guide 169, which limits the path of travel of the outer brake rod (not shown in this view) to axial and rotational movements as the outer brake rod enters outer brake rod head cavity 166. Inner brake rod 161 (not shown in this view) after passing through the outer brake rod 160 (not shown) passes through inner brake rod guide 168 and into inner brake rod head socket 164.

FIG. 8 is a partial view of first split shaft member 125 with the brake rods in place. Inner brake rod 161 passes into the proximal end of hollow outer brake rod 160, out the distal end, through inner brake rod guide 168, and finally into inner brake rod head socket 164, where inner brake rod head 174 engages inner brake rod head socket 164. This engagement results in axial movement by inner brake rod 161 along central axis CA being transferred through inner brake rod head 174 and inner brake rod head socket 164 to first split shaft member 125. Outer brake rod 160 with its outer brake rod head 173 is shown passing through outer brake rod guide 169 and into outer brake rod head cavity 166 in first split shaft member 125, wherein outer brake rod head 173 is free to move without affecting the axial position of first split shaft member 125. Axial movement of inner brake rod 161 thus moves first split shaft member 125 but axial movement of outer brake rod 160 does not move first split shaft member 125.

Figure 9:
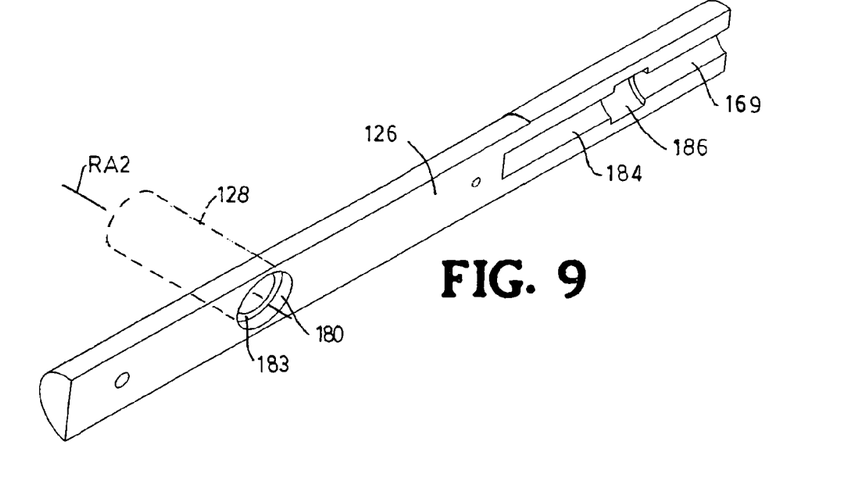
FIG. 9 is an enlarged perspective view of the second split shaft member used for supporting the somewhat schematically illustrated axle of the second reel and for braking that reel.

FIG. 9 is a perspective view of second split shaft member 126. The second split shaft member supports second reel assembly 121. Second hole 180 with second hole lip 183 in second split shaft member 126 receives and mounts an inner end of second reel axle 128 in the same manner that first hole 162 with first hole lip 163 in first split shaft member 125 receives and mounts an inner end of first reel axle 127. Outer brake rod guide 169 confines the travel of outer brake rod 160 (not shown in this view) to axial and rotational movements as outer brake rod 160 moves within second split shaft member 126.

FIG. 10 shows second split shaft member 126 with the brake rods in place. Outer brake rod 160 is shown passing through outer brake rod guide 169 and engaging outer brake rod head socket 186. This engagement results in axial movement by outer brake rod 160 along central axis CA being transferred through outer brake rod head 173 and outer brake rod head socket 186 to second split shaft member 126. Inner brake rod 161 with its inner brake rod head 174 is shown passing into the proximal end of hollow outer brake rod 160, out the distal end and into the inner brake rod head cavity 184 in the second split shaft member 126, where inner brake rod head 174 is free to move without transferring axial movement to second split shaft member 126. Axial movement of outer brake rod 160 thus moves second split shaft member 126 but axial movement of inner brake rod 161 does not moves second split shaft member 126.

FIG. 11 is a sectional view of assembled parts of both split shaft members showing both split shaft members 125 and 126 (FIGS. 8 and 10) and both brake rods 160 and 161 assembled.

In operation, a leash user holds handle 113 and attaches one or more pets to first fastener 98 and one or more pets to second fastener 99. One, two, or more pets could thus be attached to the first leash and one, two or more pets could be attached to the second leash. As the pets move away from the leash user, first leash 111 and the second leash 112 are payed out from first reel assembly 120 and second reel assembly 121, respectively. The freely rotatable sub-assembly—made up of faceplate 116, mounting tube 155, the two reel assemblies 120 and 121, their axles 127 and 128 and the two split shaft members 125 and 126—rotates around central axis CA of split shaft members 125 and 126 in response to pull by a pet fastened to one of the leashes, the rotation being in a direction that tends to prevent crossing of the leashes. This automatic rotation results because when a pet originally on the same side of the central axis as its leash passage moves to the opposite side of the central axis, the resulting imbalance creates a torque on the rotatable sub-assembly that causes the sub-assembly to rotate until the leash passage is on the same side of the central axis as the pet. This tendency of sub-assembly rotation to follow movements of the pets prevents leash line crossing and tangling.

Each of the pets can be restrained independently by actuating the appropriate brake rod trigger. Actuating inner brake rod trigger 114 locks first reel assembly 120, thus restraining the pet(s) on first leash 111. Actuating outer brake rod trigger 115 locks second reel assembly 121, thus restraining the pet(s) on second leash 112. Locking one reel assembly has no effect on the other reel assembly and no effect on the rotation of the sub-assembly. Thus either of the pets, all the pets, or neither pet, can be restrained while at the same time maintaining free rotation of the rotatable sub-assembly to permit automatic uncrossing of the leashes.

The mechanism connecting the brake rod triggers and reel brakes is similar for both reels. Pulling one brake rod trigger pulls one brake rod, which in turn pulls one split shaft member. Movement of the split shaft member moves the reel mounted on it to engage the brake teeth on that reel with a brake catch, thereby locking the reel. Specifically, pulling inner brake rod trigger 114 proximally toward the leash user causes inner brake rod 161, to which inner brake rod trigger 114 is connected, to move proximally as well. Since inner brake rod head 174 mounted on inner brake rod 161 is closely coupled to first split shaft member 125 by virtue of the head's close fit into inner brake rod head socket 164 in first split shaft member 125, first split shaft member 125 also moves proximally. Note that second split shaft member 126 does not move, because inner brake rod head 174 is in a cavity in second split shaft member 126 rather than in a socket. While the head is axially constrained inside the socket of first split shaft member 125, the head moves freely in an axial direction inside the larger cavity of second split shaft member 126 without affecting the position of second split shaft member 126. The two split shaft members thus slide past each other as one or the other trigger is pulled. Since first reel assembly 120 is mounted on first split shaft member 125, when that split shaft member moves proximally so does first reel assembly 120. That movement proximally causes first brake teeth 122 to engage first brake catch 131, thereby braking the first reel assembly.

When first split shaft member 125 is moved proximally, fourth pin 139 mounted on first split shaft member 125 presses against proximal shaft return spring 141 and compresses the spring. When the trigger is released, the compressed spring presses against the pin and urges the split shaft member distally, thereby moving the reel distally and causing the brake teeth to become disengaged from the brake catch.

Outer brake rod trigger 115 operates using a similar mechanism. Outer brake rod trigger 115 is connected to outer brake rod 160. Referring to FIG. 11, when outer brake rod 160 is actuated, outer brake rod head 173 moves axially along central axis CA. Since outer brake rod head 173 is enclosed in outer brake rod head socket 186 of second split shaft member 126, second split shaft member 126 is forced to follow the axial movements of outer brake rod head 173. In contrast, FIG. 11 shows that the same outer brake rod head 173 inside larger outer brake rod head cavity 166 of first split shaft member 125 can move freely in an axial direction without influencing first split shaft member 125. This is because outer brake rod head cavity 166 is long enough to permit outer brake rod head 173 to move freely inside first split shaft member 125 without causing first split shaft member 125 to move.

Braking while still permitting the reel assembly to rotate freely, thereby preventing leash tangling, is accomplished by coupling the rotatable sub-assembly to the two non-rotating braking controls in such a way that operating a trigger causes a split shaft member to move along the central axis while at the same time not interfering with rotation of the rotatable sub-assembly. Each of the brake rod heads couples with one appropriate brake rod head socket axially, but there is no coupling rotationally. The brake rods move in and out without affecting the assembly's ability to rotate. This method for coupling the rotatable sub-assembly to the non-rotating braking controls for independently braking each reel is believed to be unique.

A special design feature is the fit between proximal shaft return spring 141 and split shaft members 125 and 126. The inside diameter of proximal shaft return spring 141 is large enough so that when one of the shafts is retracted to brake the corresponding reel, there is enough space between proximal shaft return spring 141 and the un-retracted one of split shaft members 125 and 126 to permit continued pressure by proximal shaft return spring 141 against the pin (137 or 139) on the un-retracted split shaft member, thereby permitting braking one reel without affecting the freedom of the other reel.

It is recognized that additional embodiments of the multi-reel line-handling device can be used for purposes other than preventing entanglement of pet leashes. For example, it is contemplated that the apparatus of the invention could be used to prevent entanglement of lines fastened to two or more children, two or more fishing lines, two or more kite strings, two or more glider towlines or two or more water ski towlines. The apparatus of the invention could also be used to prevent twisting of two or more lines in a variety of other situations where two lines or support lines are used. For some of these applications, connection means between the brake rod triggers and the brake rods could be mechanical, electrical, hydraulic, or pneumatic. In addition, reel return rotation and split-shaft member movement could be accomplished using electric, hydraulic, pneumatic, or other means instead of, or in addition to, return springs.

While some embodiments of the invention have been illustrated and described in detail herein, the same is considered illustrative and not restrictive in character, it being understood that only the preferred embodiments have been shown and described and that all changes and modifications that come within the spirit of the invention are desired to be protected.

What is claimed is:

1. A multi-reel, line-handling apparatus comprising:
    (a) at least two reels on each of which is wound a line having one end anchored to the reel on which it is wound and an opposite end adapted for fastening to an object in motion, each reel being individually positionable and rotatable about its own axis of rotation;
    (b) an assembly comprising said reels and rotatable about its own central axis of rotation passing between two of said reels;
    (c) said axes of said reels being angled with respect to said central axis;
    (d) at least one brake engageable with at least one reel, said brake comprising a first member that is user-operable to engage said brake, and a second member that engages the at least one reel when the brake is engaged to restrict unwinding of the line wound on said brake-engaged reel, said first member and said second member being rotatable with respect to one another about said central axis, wherein said assembly is free to rotate about said central axis regardless of whether the brake is engaged, so as to permit continuous rotation of said assembly in response to tension on said lines; and
    (e) a housing comprising an enclosure and a handle fixed to said enclosure, wherein said enclosure encloses said assembly, and said assembly is rotatable with respect to said handle and said enclosure about said central axis of rotation.

2. The multi-reel, line-handling apparatus of claim 1, wherein said axes of said reels are angled with respect to said central axis by substantially 90 degrees.

3. The multi-reel, line-handling apparatus of claim 1, further comprising a second brake engageable with a second of said reels to restrict unwinding of the line wound thereon.

4. A multi-reel, line-handling apparatus comprising:
    (a) at least two reels on each of which is wound a line having one end anchored to the reel on which it is wound and an opposite end adapted for fastening to an object in motion, each reel being individually positionable and rotatable about its own axis of rotation;
    (b) an assembly comprising said reels, and rotatable about its own central axis of rotation passing between two of said reels;
    (c) at least one brake engageable with at least one reel, said brake comprising a first member that is user-operable to engage said brake, and a second member that engages the at least one reel when the brake is engaged to restrict unwinding of the line wound on said brake-engaged reel, said first member and said second member being rotatable with respect to one another about said central axis, wherein said assembly is free to rotate about said central axis regardless of whether the brake is engaged, so as to permit continuous rotation of said assembly in response to tension on said lines; and (d) a housing comprising an enclosure and a handle fixed to said enclosure, wherein said enclosure encloses said assembly, and said assembly is rotatable with respect to said handle and said enclosure about said central axis of rotation.

5. A multi-reel, line-handling apparatus comprising:
(a) at least two reels on each of which is wound a line having one end anchored to the reel on which it is wound and an opposite end adapted for being fastened to an object in motion;
(b) a rotatable shaft on which said reels are mounted, said rotatable shaft defining a central axis of rotation;
(c) a first brake rod extending along said central axis of rotation, wherein said first brake rod is operable to move along said central axis of rotation to engage exactly one first reel of said at least two reels with a brake that restricts rotation of said first reel;
(d) a second brake rod extending along said central axis of rotation, wherein said second brake rod is operable to move along said central axis of rotation to engage exactly one second reel of said at least two reels with a brake that restricts rotation of said second reel.

6. The multi-reel, line-handling apparatus of claim 5, further comprising a faceplate located proximate to said reels and having two or more oppositely positioned holes through which said lines are passed, said faceplate being responsive to pull by an object fastened to one of said lines by rotating in a direction that tends to prevent crossing of said lines.

7. The multi-reel, line-handling apparatus of claim 5:
(a) wherein said shaft comprises at least two elongated members located between said reels, and wherein each one of said members provides support for at least one of said reels; and
(b) wherein each of said brake rods engages one of said elongated members so as to move said member, thereby causing engagement of the corresponding said reel mounted thereon with a brake so as to restrict rotation of said reel.

8. The multi-reel, line-handling apparatus of claim 7, wherein said elongated members are spring-loaded, and wherein such spring loading urges each said reel away from a said brake, and wherein said spring loading can be overcome by each said brake rod.

9. The multi-reel, line-handling apparatus of claim 7, wherein:
(a) said elongated members contain a plurality of cavities capable of partially containing said brake rods; and
(b) said brake rods have enlarged portions, which engage some of said cavities and not other of said cavities, so as to transfer brake rod motion to those of said elongated members having cavities engaged with said brake rods but not to said elongated members lacking cavities with which said brake rods are engaged.

10. The multi-line, reel handling apparatus of claim 5, further comprising:
a housing comprising an enclosure and a handle rotationally fixed to said enclosure, wherein said enclosure encloses said assembly, and said assembly is rotatable with respect to said handle and said enclosure about said central axis of rotation.

* * * * *